United States Patent
Luik (10) Patent No.: US 7,423,734 B1
(45) Date of Patent: *Sep. 9, 2008

(54) COMBINED VIDEO CAMERA AND TOOLHOLDER WITH TRIANGULATION SENSING

(76) Inventor: Ilmar Luik, 169 Bolling Rd., Meridianville, AL (US) 35759

( * ) Notice: Subject to any disclaimer, the term of this patent is extended or adjusted under 35 U.S.C. 154(b) by 556 days.

This patent is subject to a terminal disclaimer.

(21) Appl. No.: 10/683,178

(22) Filed: Oct. 9, 2003

Related U.S. Application Data (63) Continuation-in-part of application No. 09/841,201, filed on Apr. 24, 2001, now Pat. No. 6,647,840.

(60) Provisional application No. 60/199,625, filed on Apr. 25, 2000.

(51) Int. Cl.
*G01C 3/00* (2006.01)
*G01C 5/00* (2006.01)

(52) U.S. Cl. .................... 356/3.01; 356/141.1

(58) Field of Classification Search ............. 356/3.01, 356/4.03, 4.05, 141.1, 141.2, 139.04; 451/5–11
See application file for complete search history.

(56) References Cited

U.S. PATENT DOCUMENTS

| | | | | |
|---|---|---|---|---|
| 4,712,970 A | * | 12/1987 | Nakamura et al. | 414/730 |
| 5,517,420 A | * | 5/1996 | Kinsman et al. | 700/166 |
| 5,718,832 A | * | 2/1998 | Mori | 219/121.83 |
| 5,829,928 A | * | 11/1998 | Harmand et al. | 408/83.5 |
| 5,852,276 A | * | 12/1998 | Yamazaki et al. | 219/121.62 |
| 5,956,253 A | * | 9/1999 | Gottschalk | 700/186 |
| 6,508,692 B2 | * | 1/2003 | Gottschalk | 451/5 |
| 6,610,991 B1 | * | 8/2003 | Case | 250/559.19 |

* cited by examiner

*Primary Examiner*—Isam Alsomiri
(74) *Attorney, Agent, or Firm*—Lanier Ford Shaver & Payne P.C.; Steven M. Clodfelter (57) ABSTRACT

A system for determining depth, height and other reference information with respect to features on a workpiece is disclosed. A camera is mounted in a CNC toolholder so that the lens of the camera is coaxial with a rotational axis of the CNC toolholder. A laser is mounted radially outward from the camera, and directs a laser beam angularly toward the workpiece and within the field of view of the camera. With knowledge of the precise angle of, the laser beam with respect to the rotational axis of the toolholder, height and depth information of features on the workpiece may be obtained from where the reflection of the laser beam falls on the CCD array of the camera. A computer, which may be the computer of the CNC machine, may be provided with the height, depth and other reference information.

19 Claims, 7 Drawing Sheets

COMBINED VIDEO CAMERA AND TOOLHOLDER WITH TRIANGULATION SENSING

CROSS REFERENCE TO RELATED APPLICATIONS

This application is a continuation-in-part of U.S. patent application Ser. No. 09/841,201, filed Apr. 24, 2001 now U.S. Pat. No. 6,647,840, which claims the benefit of provisional application No. 60/199,625, filed Apr. 25, 2000.

FIELD OF THE INVENTION

This invention relates to a video camera positioned on the axis of rotation of a toolholder of a machine tool, the toolholder being typical of a toolholder found in a computer controlled machine, with an incorporated triangulation system for locating features and reference points and calculating depths and heights of features with respect to a workpiece.

BACKGROUND OF THE INVENTION

One of the problems with computer controlled machine tools (CNC tools) is their relatively extensive setup time wherein an operator of the machine programs a computer with orthogonal x, y and z coordinates related to a workpiece and establishes a reference point or origin, typically designated as 0,0,0, within these x, y and z coordinates. This is done by selecting a desired point on the workpiece to serve as the reference point and then moving a toolholder to a point directly above or to another position in a selected relationship with the reference point. This position of the toolholder is then designated as the 0,0,0 reference position. From this reference position, the computer then may guide the toolholder through a series of motions to effect drilling, milling and other machining operations that are referenced to the selected reference point.

In order to reduce setup time and facilitate the setup procedures, Applicant has developed an integral camera and toolholder wherein the view from the camera is centered on the axis of rotation of the toolholder. Crosshairs or other indicia indicating the exact center of the Z axis of rotation of the integral toolholder and camera may be electronically inserted into the video from the camera, both of which being displayed together on a monitor. In other embodiments, a system similar to triangulation sensing may be used to locate features and perform depth/height measurements on a workpiece, such as locating edges, openings, protrusions and measure their depths/heights.

Accordingly, it is one object of the invention to provide such a toolholder that may be installed in a toolholding chuck of a CNC machine tool in order to optically establish X, Y and Z reference points for the machine tool. It is another object of the invention to provide a system wherein triangulation sensing techniques are used to locate features and take depth/height measurements. Other objects will become clear upon a reading of the following specification.

DETAILED DESCRIPTION OF THE DRAWINGS

Figures 1, 2, 2A:
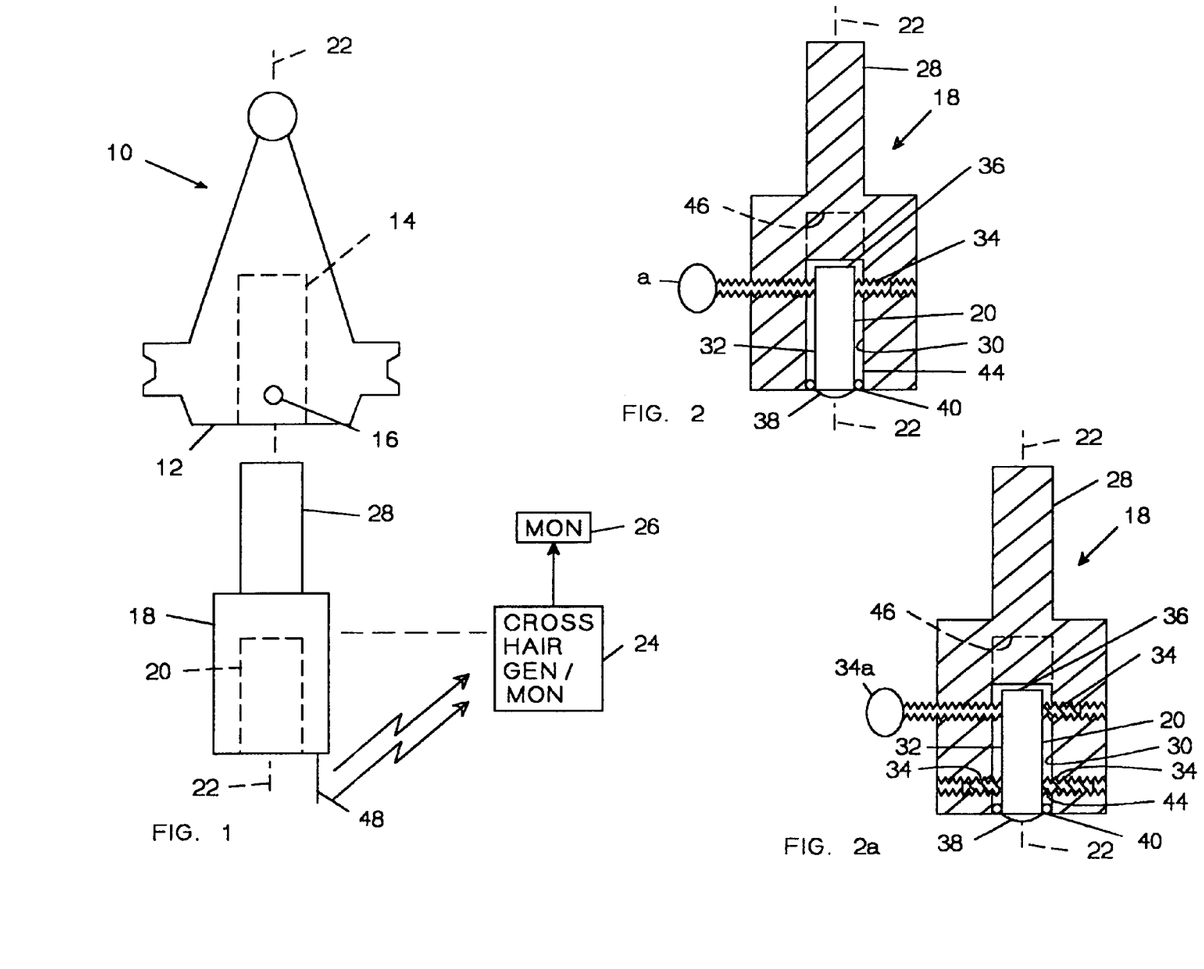
FIG. 1 is a view showing a camera of the instant invention shown in exploded relation with a toolholder.
FIG. 2 is a cut-away section of a camera and housing of the instant invention.
FIG. 2a is a view similar to FIG. 2 showing construction details.

Referring initially to FIG. 1, a toolholder 10 is shown, this toolholder being of the type conventionally used in computer numeric controlled (CNC) machine tools. These toolholders are configured at an end 12 for receiving or otherwise handling a plurality of types of machine tools such as drills, milling tools, taps and others. In some instances, the toolholder may be particularly configured to receive a particular type of tool, and in other instances the toolholder may receive different types of tools. For instance, one type of toolholder may be configured having an end 12 provided with a threaded shaft upon which a chuck may be mounted, which chuck receiving a variety of drills, end mills or the like. Another toolholder, as shown in FIG. 1, is provided with an end 12 having a smooth bore 14 coaxial with the center of rotation of the toolholder, with a tool inserted into bore 14 being locked in place by a setscrew 16 or other type latch or clamp. For accuracy, a shaft portion (of a tool) that is to be fitted into bore 14 is constructed so that it will closely fit in bore 14, and be held in place by setscrew 16. In some instances, a shaft of the tool may be keyed so that the setscrew or other latch bears on a flat surface of the shaft.

Applicant has provided, in a ruggedized housing 18, a small camera, which may be a miniature CCD or similar camera 20, such as a "lipstick"-type camera. One example of such a camera is model PC 51, manufactured by SUPERCIRCUITS, INC at One Supercircuits Plaza, Leander, Tex. Camera 20 is mounted in housing 18 so that a lens of the camera is coaxial with an axis of rotation 22 of housing 18, housing 18 in turn being coaxial with an axis of rotation of toolholder 10 when mounted in bore 14. Housing 18 is further provided with a shaft 28 dimensioned so as to closely fit bore 14 in toolholder 10 as described.

Figure 4:
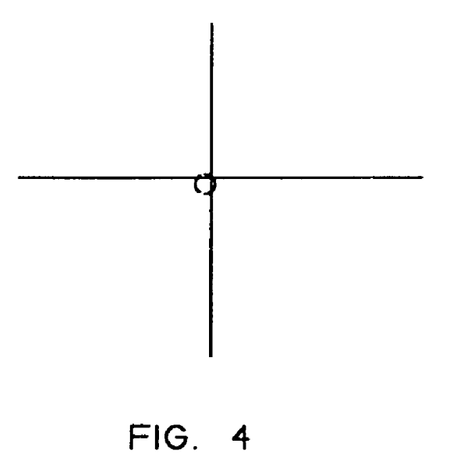
FIG. 4 is a view of crosshairs of the present invention.
Figure 4A:
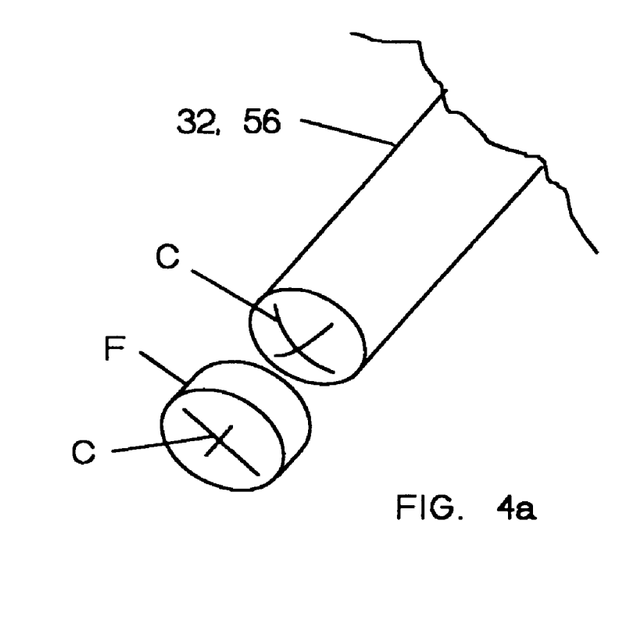
FIG. 4a is a view of one way crosshairs may be incorporated in the present invention.

The video signal from camera 20 may be transmitted by a radio or infra-red link, or picked up by slip rings or other conductors adapted for transferring signals between rotating components. Where an infrared link is used, provisions may be made so that the link is maintained when the tool is rotated. The video so obtained is applied to a cross hair or other graphic generator 24 and subsequently to a monitor 26, the crosshair generator 24 serving to insert cross hairs or some other indication of the center of the view of the camera. It is to be noted that the crosshairs are linked with the video such that they move with movement of the camera. Alternately, as shown in FIG. 4a, the crosshairs C may be permanantly scribed or etched on a lens of the camera, or incorporated on a transparent cover or filter F fitted over the lens end of the camera as by screw threads or by friction. In these instances, the crosshairs or other indicia would thus need to be within the focal length of the camera lens so as not to be blurred. In addition to or in place of crosshairs, other graphics that would assist an operator in locating specific features or a reference point may be used. For example, circles based on a visible radius point, the radius point being set to the exact center of rotation of the toolholder, may be used to accurately locate a bore or circular opening in a workpiece. Here, a single circle may be used, and which is adjustable in size so as to match a size of an opening on the workpiece in order to precisely locate an opening to be used as a reference point. Likewise, straight lines that are generated by the graphic generator and rotatable and movable by an operator may be used in conjunction with a point indicating a center of rotation of the toolholder where edges or corners are to serve as a reference point.

Housing 18 is shown in greater detail in FIG. 2. Here, it is seen that camera 20 may be mounted in a bore 30 in housing 18 that is somewhat larger than an exterior housing 32 of camera 20. A plurality of setscrews 34 may be provided around an exterior upper end 36 of camera 20, these setscrews serving to adjustably support camera 20 at its upper end 36. Alternately, instead of setscrews, thumbscrews 34a may be used to provide more convenient adjustment of the camera. A lower end 38 of camera 20 may be relatively tightly but flexibly supported by an elastomer mount, such as an O-ring 40 fitted in a groove 42 of a lower interior region 44 of bore 30. Additionally, a shock absorbing mount may be provided at the upper end 36 of camera 20, such as a ring of relatively stiff rubber around camera housing 32 on which setscrews 34 bear. With such a mounting, camera 20 is rigidly held in place in bore 44 of housing 18 but is isolated from vibration and shock. In another embodiment, setscrews 34 may also be provided at a lower end of the camera adjacent a lens thereof. Here, the upper and lower setscrews would be adjusted in conjunction with one another in order to adjust an axis of the camera to coincide with an axis of rotation of the toolholder. In this embodiment, the resilient mounting may still be included in order to dampen vibrations. In addition, the setscrews may be made of an elastomer material, such as nylon, in order to dampen vibrations and prevent damage to the camera housing from overtightening of the setscrews.

Camera 20 may be powered by batteries incorporated into housing 18, with a video signal from the camera being transmitted by a short range radio link to a receiver. Alternately, and as stated, slip rings may be provided to provide power to the camera and pick off the video signal from the camera. In the instance where a video signal is transmitted by radio link, an antenna 48 may be provided in an end of housing 20.

Figure 3:
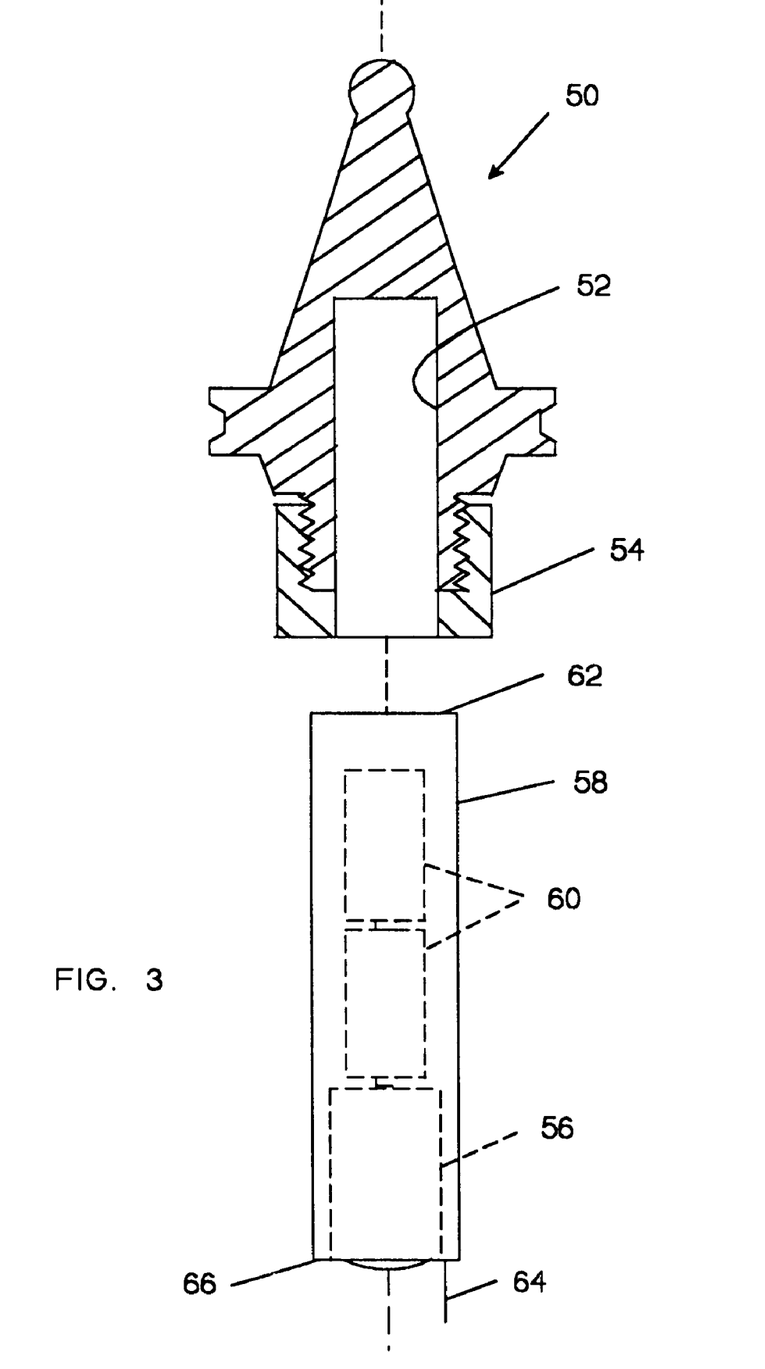
FIG. 3 is a cut-away view of a toolholder including a chuck and another embodiment of a camera and housing of the instant invention.

In another embodiment, and as shown in FIG. 3, a toolholder 50 is shown having a relatively large bore 52 and a collet 54 or the like for holding a tool in bore 52. A camera 56 is mounted in a housing 58 sized to be closely fitted in the bore 52 of the toolholder. In this embodiment, housing 58 is sufficiently large so as to receive batteries 60 for powering the camera and associated electronics, which electronics including a short-range radio link for transmitting video to a receiver and cross-hair generator 24 (FIG. 1). As stated, an antenna 64 extending from amend 66 of housing 58 may be provided to transmit the video signal to the receiver. Access to the batteries may be provided by making end 62 of housing 58 removable, as by screw threads, in a similar manner as a flashlight. Power to the camera may be switched on and off by a switch (not shown) or by simply removing the batteries. The housing 58 may protrude from an end of the toolholder, or may be constructed so as to be flush therewith or be located at a selected reference point, as will be explained. Additionally, adjustment for the camera within housing 58 may be provided as described for camera 20 of FIG. 1.

In use, and referring to FIG. 1, camera 20 is mounted in housing 18, and housing 18 in turn mounted in a toolholder 10. The toolholder may then be inserted into or picked up by an automatic tool changer and secured in a spindle of the CNC machine tool. After the toolholder containing the camera is secured in the spindle, it may then be rotated to determine any misalignment of camera 20 from the axis of rotation 22 of toolholder 10. As shown in FIG. 4, with the crosshairs inserted into the view from camera 20, such misalignment immediately becomes apparent when the toolholder is rotated. Here, the center point of the crosshairs will move in a circle (dashed lines) with rotation of the toolholder when the camera is not perfectly aligned with the axis of rotation 22. After it is determined that misalignment is present, the axis of camera 20 may be adjusted by appropriately turning setscrews 34 (or thumbscrews 34a) until the center of the crosshairs remains fixed on a single, rotating point as the toolholder is rotated. At this point, the crosshairs are aligned with the axis of rotation 22 of the toolholder. Alternately, instead of mounting housing 18 with camera 20 mounted therein as described, the housing 18 may be mounted in a centering chuck in turn mounted to a toolholder 10. In this embodiment, it would be assured that housing 18 would be centered on axis of rotation 22. The camera may then be adjusted as described so that the crosshairs are aligned with the axis of rotation of the toolholder. After being adjusted, the toolholder holding the camera may then be moved so that the crosshairs are centered on the desired reference point. After such adjustment, the camera will maintain its adjusted position, and should not require further adjustment unless the toolholder incurs some adverse event, such as being inadvertently dropped.

In the embodiment of FIG. 3, the housing 58 is inserted in the toolholder and chuck 54 tightened to secure housing 58 therein. The toolholder is then be mounted in the spindle of a CNC machine tool and the camera focused on the workpiece. The spindle is moved to center the crosshairs on a reference point on the workpiece and such point entered to designate the origin or other reference in the coordinate system used by the CNC tool.

In one embodiment, the camera may be powered by one or more batteries housed inside a compartment 46 (dashed lines) in housing 18 of FIG. 2. A miniature, short range transmitter may also be housed in compartment 46 for transmitting the video signal to a receiver associated with monitor 26. In another embodiment, the video signal may be transmitted via an infra-red link, with a transmitter mounted to or in housing 18 and a receiver associated with monitor 26. One or more infra-red reflectors may be positioned around the rotating toolholder to assure a contiguous link with the monitor. In yet another embodiment, an outer housing or shell (not shown) may be rotatably mounted around housing 18, the shell providing power and a video link from/to the camera by brushes or slip rings. In this instance, a power supply may be hard wired to the shell, and a video signal may be hardwired to the crosshair or other graphics generator, in turn coupled to the monitor. Of course, any combination of transmitters, inductive powering of the camera and possibly a transmitter, or hard wiring, may be used to provide power to at least the camera and to pick off a video signal from the camera.

As accuracy of the system described above is dependent on the crosshairs or other indicia of the center of the field of view from the camera being exactly aligned with the axis of rotation of the toolholder, a magnifying lens may be employed to magnify the image taken by the camera. Such a lens may be replaceable so that lenses of differing magnification may be used depending on accuracy required for a particular machining operation. Also, during initial aligning of the camera, lenses of varying magnification may be successively used to achieve a high degree of accuracy. Filters may also be used for blocking glare, or for selectively blocking or passing light in a desired portion of the spectrum.

During setup of a computer operated machine tool using Applicant's camera, the operator would cause the integral toolholder and camera to be inserted into the spindle of the machine tool. At that point, and with the crosshairs or other indicia already centered about the toolholder's axis of rotation by any of the methods described above, the operator would move the spindle to locate the crosshairs at a point on a workpiece where a reference point or origin is to be designated, such as a 0,0,0 reference point in a Cartesian, polar, rectangular, or any other three dimensional coordinate system used by the CNC machine tool. Once the crosshairs are established at the desired reference position, this reference position is set in the computer. This eliminates the manual steps of using edge finders or dial gages, either separately or together, for setting the machine tool's coordinate axis to the desired location with respect to the position of the part to be machined. As stated above, where the reference is the center of a bore or opening, a radius-based circle may be generated by the graphics generator and adjusted in size to as closely match the bore or opening as possible, the generated circle being superimposed over the opening in the workpiece in order to accurately locate the center of the bore or opening.

Figure 5:
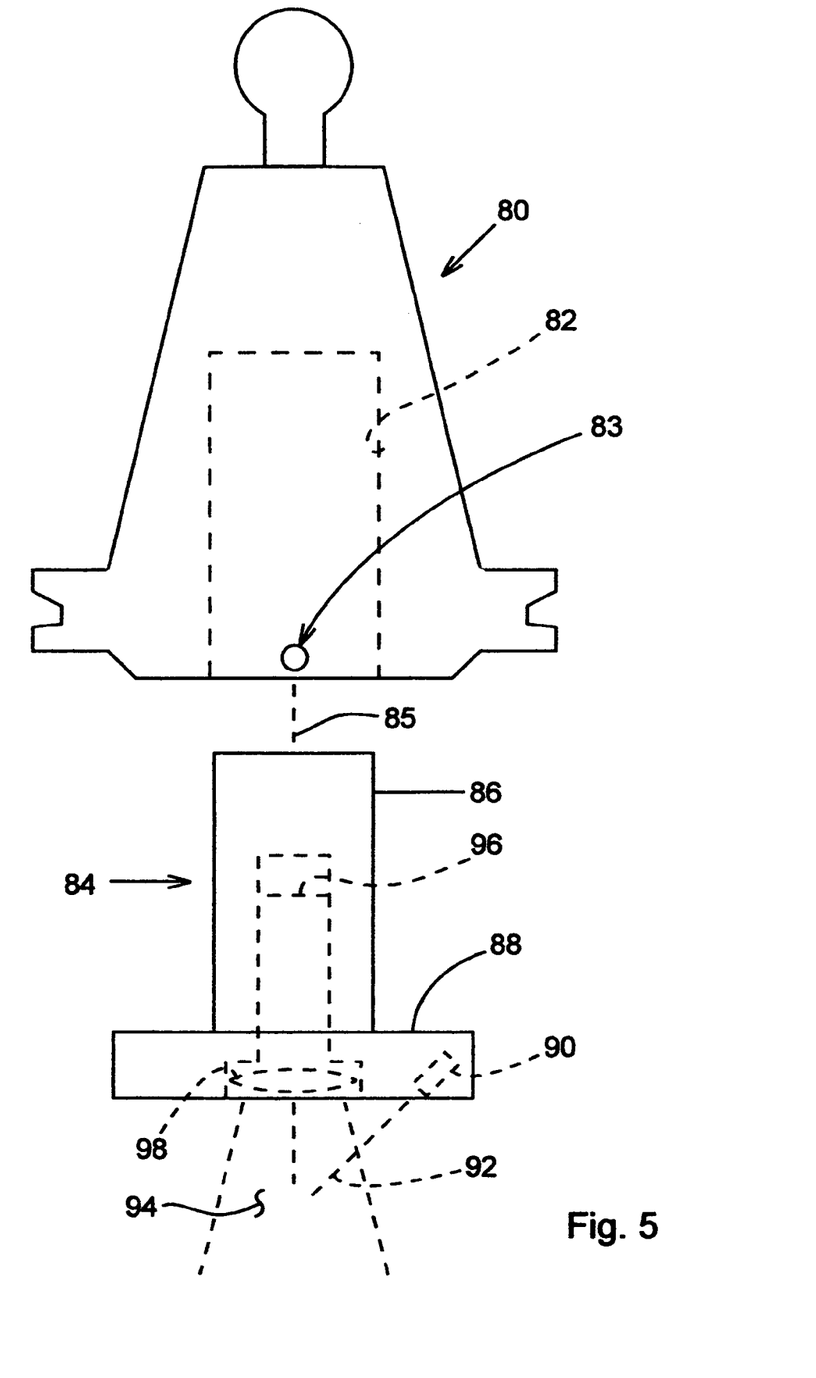
FIG. 5 is a diagrammatic illustration of another embodiment of the invention incorporating a triangulation system.

In yet another embodiment of Applicant's invention, and referring to FIG. 5, a toolholder 80 is shown as having a bore 82 for receiving an insert 84. Bore 82 is accurately machined so as to be as concentric as possible about a rotational axis of the toolholder. Insert 84 is provided with a shaft portion 86 constructed to be closely fitted within bore 82, and may be locked in place with a lock bolt, such as a threaded Allen-type bolt or other locking fastener 83. Provisions for adjusting position of the camera, as described above, may also be provided in the insert, the toolholder or both. In other embodiments, insert 84 may be permanently or semi-permanantly fitted in toolholder 80, as by an interference fit wherein the insert is pressed into place or the toolholder thermally expanded and the insert fitted therein while the toolholder is hot. In this instance, the insert would be constructed so that internal components sensitive to heat are thermally insulated. In other embodiments, the parts for the system may be permanently fitted within a housing constructed in the form of a toolholder.

Where an insert is provided, and referring to FIG. 5, insert 84 may be provided with an extension portion 88 that extends radially away from an axis 85 of the toolholder. This extension 88 may be constructed as a thickened flange, or simply may be a protrusion attached to the insert and extending away from axis 85. A light source 90 for providing a beam of light, which may be a laser, such as a laser diode, in which case the beam is tightly focused and collimated, is mounted in extension portion 88 so as to direct the beam 92 across the imaging field 94 of a light sensor or video camera 96, which may be a CCD pixel array camera or a FOVEON™ X3 image sensor, a lateral effect photodiode sensor or any other camera or light sensor that provides an electrical output that can be analyzed using computer techniques. A lens 98 may be used to magnify or otherwise condition the image taken by camera 96, and may include any number of spectral filters for allowing only certain types of light to reach camera 96. In addition, ultraviolet or infra-red laser diodes may be used in conjunction with respective ultraviolet or infra-red cameras and detectors where ambient light would otherwise saturate the detector 96 or overwhelm light from laser 90.

Figure 6:
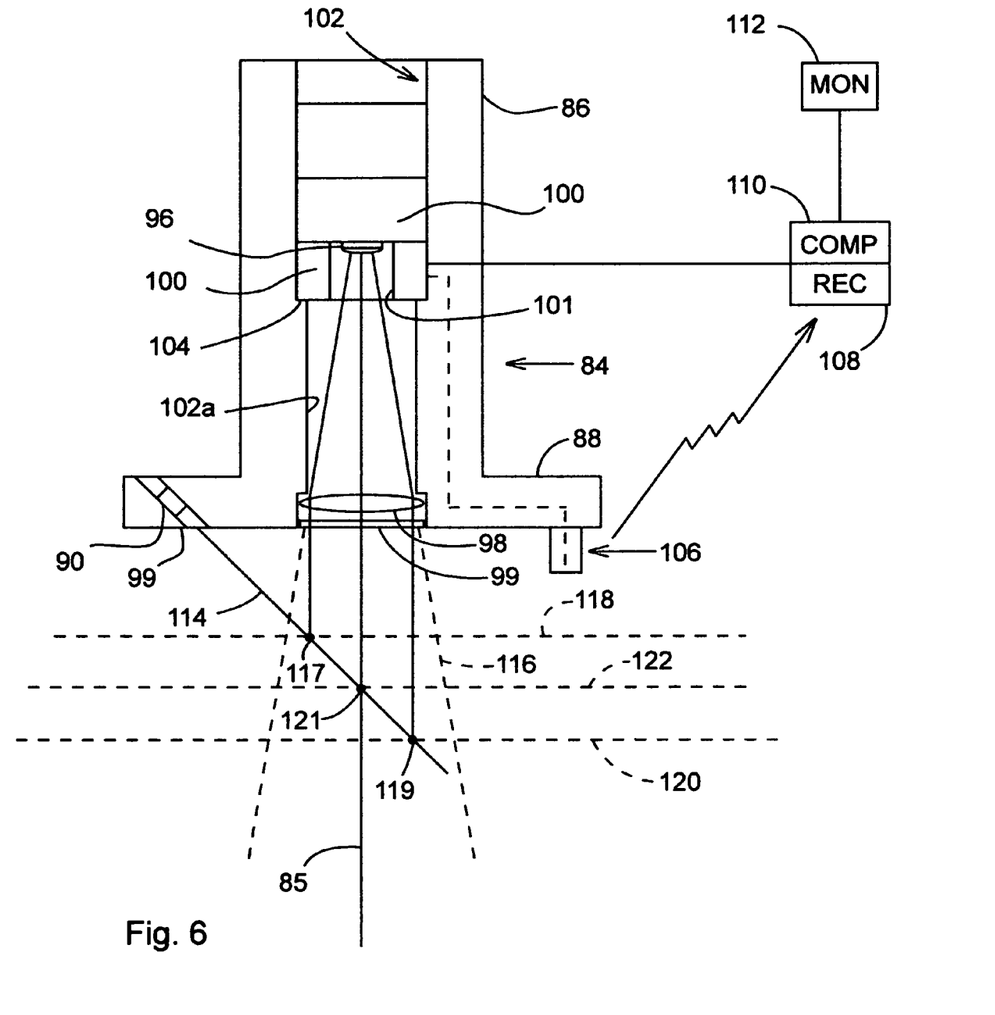
FIG. 6 is a diagrammatic view showing general construction details of the triangulation system as shown in FIG. 5.

Referring to FIG. 6, an illustration of a simple insert 84 of the present invention is shown. The video camera or sensor 96 may be supported by or mounted to an upper block of blocks 100, the block closely machined to fit a bore 102 within a shaft portion 86 of the insert. In other embodiments, camera or sensor 96 may be mounted or constructed in an integral housing within insert 84, or where the camera is fitted to a circuit board, the circuit board may be mounted so as to accurately position the camera along axis 85 of the insert. Where blocks 100 are used, an opening 101 in a lower block 100 allows the camera or sensor 96 to receive an image from below insert 84. A lip 104 may in turn support blocks 100. The blocks 100 may contain support electronics (not shown) for camera or sensor 96, along with the power supply, such as a battery (also not shown). Such electronics and power supply are well known in the art, and should not require further explanation. As described, an output of the camera/sensor may be coupled to a wireless transmitter, which may be a radio, infra-red or other transmitter, which is in turn coupled to an antenna or other wireless transceiver 106. The data obtained and passed by antenna 106 is received by an appropriate receiver 108, and provided to a computer 110 in turn programmed with algorithms for interpreting the data, and where appropriate, applying the analyzed data to a CNC or other automated or semi-automated machine. In its simplest form, data provided would simply be height and depth measurements along with an indication of axis of rotation of the toolholder. Again, such technology and algorithms are well known, and should require no further explanation. As stated, an image or other information related to a field of view 116 is thus transmitted to a receiver 108, which may include a computer processor 110, with a display 112 for interfacing to the system. Where computer 110 is associated with a CNC-type machine, a keypad and possibly a mouse (both not shown) may also be provided for programming the system.

As stated, a light source 90, which in the case of a laser diode, provides a tight, highly focused and collimated beam 114 that is directed angularly downward across a field of view 116 taken by the camera or sensor. Beam 114 may develop a tiny spot on the workpiece, or the laser may be configured to radiate the beam in a plane so as to develop a line on the workpiece. In any case, the point of light or line on the workpiece, when the workpiece is set at a reference distance away from the insert, is centered on or passes through axis 85. The laser may be mounted generally at any known angle less than 90 degrees with respect to axis 85, such as 30 degrees, 45 degrees etc., although a steeper angle with respect to axis 85 may be preferable in order to prevent the point or line of light from elongating, thus becoming larger and possibly degrading accuracy. As stated, a lens 98 mounted in bore 102a and coaxial with axis 85 may magnify an image taken by camera or sensor 96, and one or more filters 99 may be mounted so as to selectively pass or block light to/from camera or sensor 96. Such filters are useful where an infrared or ultraviolet light source is used in order to enhance the view taken by the camera or sensor or provide a system sensitive only to selected wavelengths of light.

Optical triangulation may be used to ascertain information related to the workpiece. Here, where a point of light is projected on the workpiece from light source 90, distance dimensions of features from the camera or sensor, or a reference point or plane on the insert that may be correlated with the toolholder, such as surface 99 of the insert, may be inferred by knowledge of the angle of the light beam and where on the sensor the point of light from the reflection falls. For instance, a reflection of a point of light 117 that falls on a surface or feature of a workpiece in a plane 118 causes a tiny point of light to fall on the sensor or CCD array at one point, while a reflection from a point of light 119 in a plane 120 causes a point of light to fall on a different tiny point on the sensor or CCD array. With the insert calibrated so that a reflection from a point of light 121 in a reference plane 120, i.e. a plane at a known distance from lens 98, the tiny point of light falls on a point on the sensor or CCD array that is designated as a reference point. Such a reference point is typically located in the center of the sensor or array, but need not necessarily be so. Where the sensor is a CCD array, the group of pixels upon which the reference point falls would be taken as the reference point of the CCD array. Also, where pixels make up the sensor, a centroid of the reflection falling on the pixels may be calculated to derive a more exact location.

Where light source 90 is configured to project a plane of light, developing a line of light on the workpiece instead of a point, features on a surface of a workpiece may be measured and profiles determined. For instance, size of an opening in such a workpiece may be determined and the opening's center determined due to that portion of the projected line of light that falls within the opening not being reflected back to the sensor. As such, to the sensor or camera, the line of light appears to be broken. Using appropriate computer algorithms, diameter of such an opening may be ascertained by analyzing the broken portion of the line. Further accuracy with respect to size of the opening may be obtained by moving the workpiece beneath the toolholder holding the insert.

Figure 7:
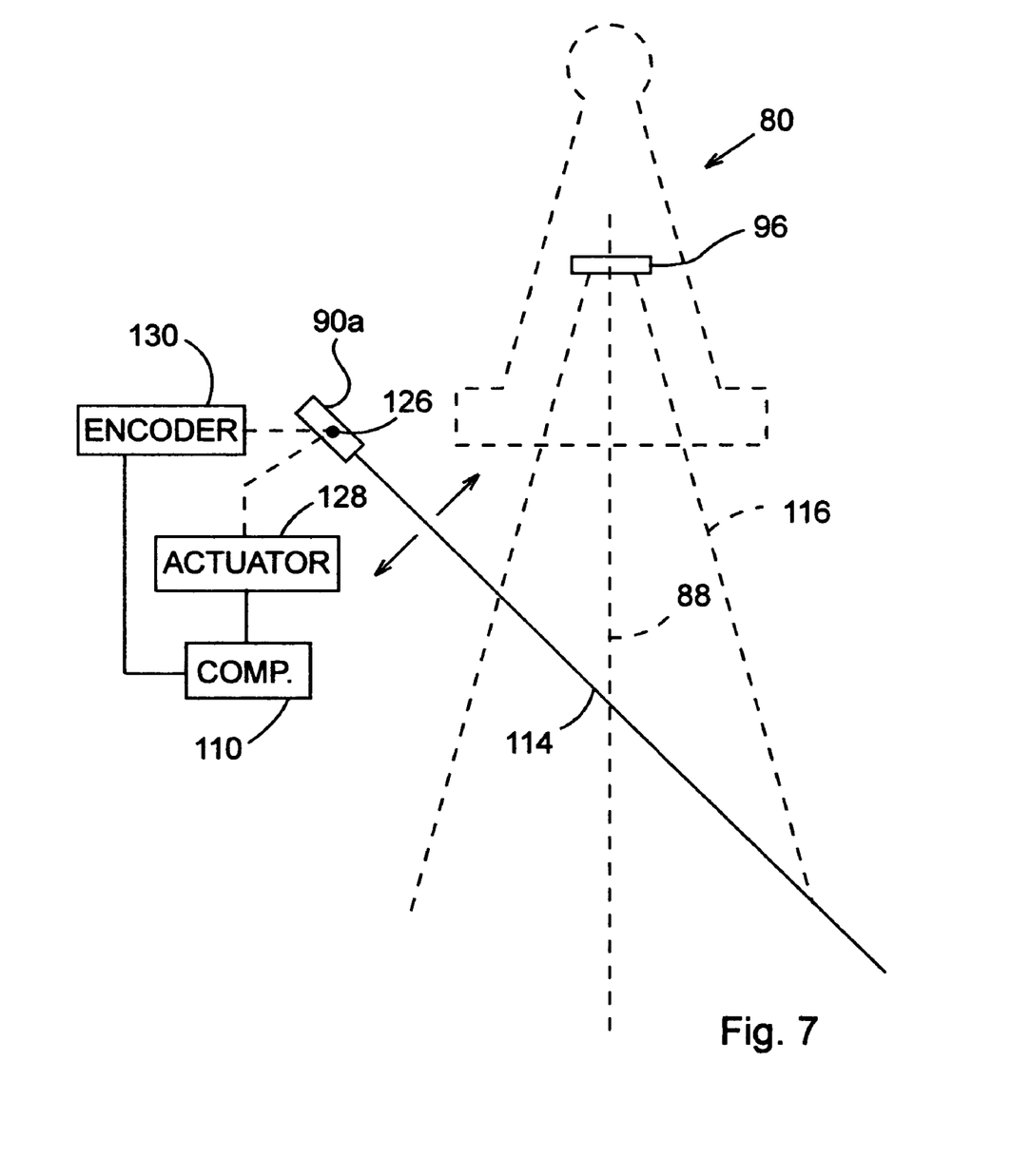
FIG. 7 is a diagrammatic illustration of one way for moving a light source of the present invention.

In yet another embodiment of the present invention, and referring to FIG. 7, the light source 90a may be mounted on a pivot point 126 so as to be rotatable about the pivot point 126 by an actuator 128. Actuator 128 may be a stepper motor that provides feedback as to the angular position of the light source, or may simply be a DC motor controlled in the manner of a servo motor. Actuator 128 may be coupled for control by computer 110, or may be manually controlled. Where feedback from the actuator is not provided, an encoder 130 may be coupled to the light source 90a so as to provide a digital indication of the angle of beam 114 to computer 110. In the embodiment of FIG. 7, the beam of light 114 may be moved across a workpiece, continuously taking height and depth measurements of features as the beam is scanned across the workpiece. Where the beam is configured to project a plane of light, the plane may be swept across a workpiece from one position, after which the toolholder or workpiece may be rotated a selected amount to a second position, such as 90 degrees, and the plane swept across the workpiece from the second position. Such an arrangement would provide topographical information about the workpiece that could be converted into accurate height and depth measurements, as well as measurements related to dimensions of features on the workpiece in a plane generally normal to axis 88 of the toolholder.

Given Applicant's disclosure, it should be apparent to one skilled in the arts that many useful variants are possible. For example, a plurality of light sources 90 may be positioned around axis 85 in extension 88 so as to direct a number of collimated beams or planes across field of view 116 of sensor or camera 96. In this instance, mapping and topography operations of irregular features of a workpiece may be accomplished. In addition, the toolholder holding the insert may be rotated, which in conjunction with a light source configured to project a plane as described above, may also be used to perform mapping and topography operations with respect to a workpiece. Also, in any of the described embodiments, the light source may be mounted in or to the toolholder, or as shown in FIG. 7, the light source may be mounted independently from the toolholder (dashed lines).

For more on optical triangulation sensors and techniques, the reader is directed to an article by Dr. Walt Pastorius, entitled "TRIANGULATION SENSORS, AN OVERVIEW", available from LMI TECHNOLOGIES, INC., at 205-7088 Venture Street, Delta, BC V4G 1H5, Canada, and which is incorporated herein by reference.

In addition to the foregoing, Applicant's invention may be used in calibration applications. Here, there are instances during fabrication of parts with CNC machine tools wherein it is required that the components of a CNC machine tool be checked to ensure that they are still true, or that wear of the components has not introduced inaccuracies in the fabricated parts. Such calibrations interrupt fabrication processes and can be time consuming. In order to facilitate such calibrations and detect wear in machine ways of CNC tables and the like, Applicant proposes a modification of the toolholder of FIGS. 6 and 7. Here, and referring to FIG. 8, Applicant's toolholder of FIGS. 6 and 7 is provided with an adapter 152, which may be a tubular housing mounted to toolholder 150 coaxial with axis of rotation 88. Within adapter 152 is mounted a precision mirror 154 positioned at a 45 degree angle with respect to axis of rotation 88. A laser generator 156 is also provided, and configured for providing as sharp a laser beam as possible. Laser generator 156 is provided with a base 158, which may be a releasable magnetic base for releasably clampable engagement with a precision surface 159 of a machine table 160 of a CNC tool. Base 158 is precision ground so as to be as closely parallel as possible with a beam emitted by the laser generator, which may be adjustable in order to effect fine adjustments to achieve the desired degree of parallelism between the plane of base 158 and the laser beam.

Figure 8:
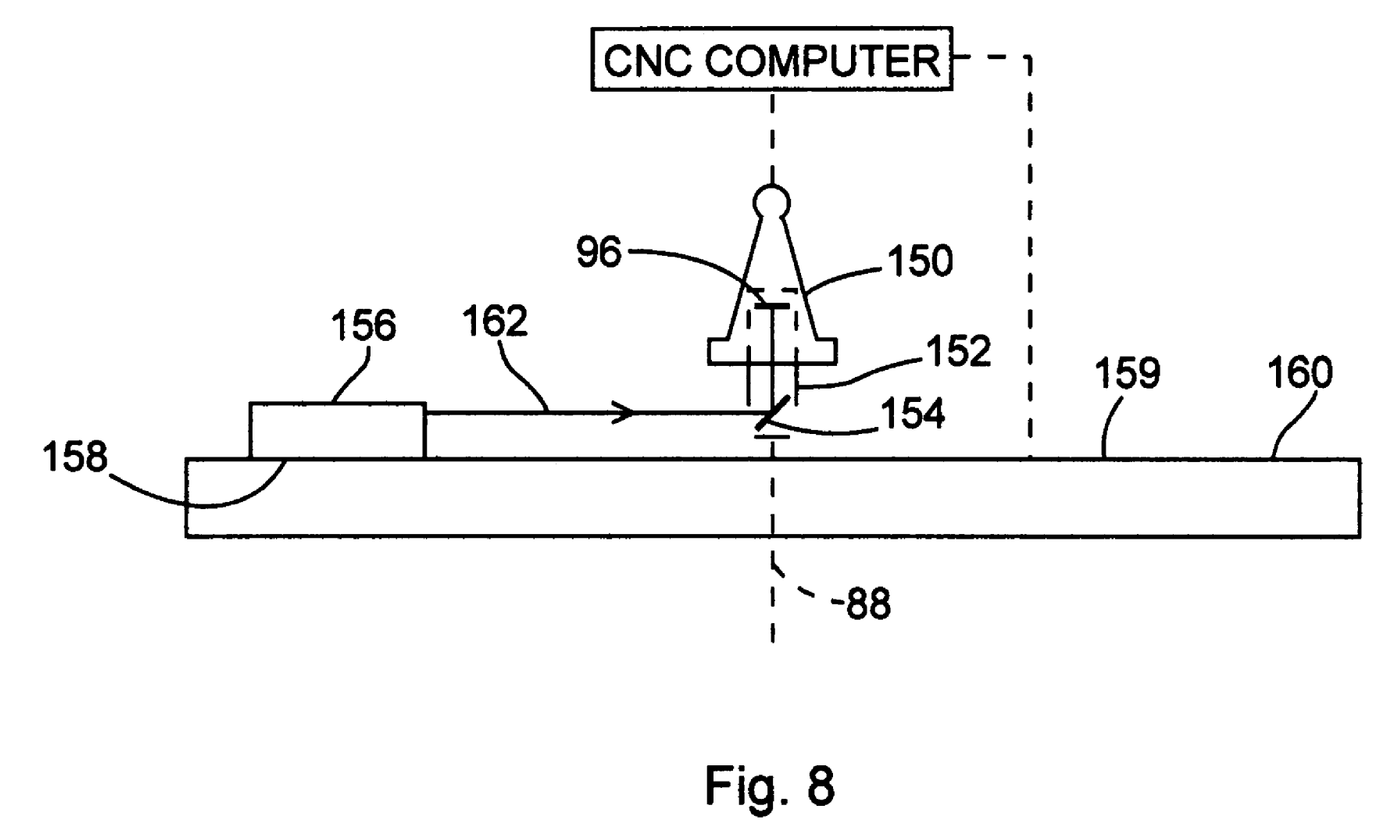
FIG. 8 is a diagrammatic view of yet another embodiment of the present invention.

In order to calibrate a CNC table and spindle, laser generator 156 is placed on or magnetically clamped to the precision surface 159 of table 160 at a location such that laser generator 156 may be moved directly toward and away from the spindle by table 160. The spindle is then positioned so that laser beam 162 impinges mirror 154 in adapter 152, which in turn directs the beam to sensor 96. At this point, the point where the laser beam impinges on sensor 96 may be observed on monitor 112 (FIG. 6). While it may be desirable for the point at which the laser beam strikes sensor 96 to be on the axis of rotation, there is no particular requirement that this be the case. Rather, a set of crosshairs or other indica, such as a circle sized to generally match a size as the laser beam point, may be centered on the laser beam as reflected by mirror 154.

To determine whether the table is in horizontal alignment, the table is translated horizontally in both directions, moving the laser generator 156 both toward and away from toolholder 150. Where the table is in horizontal alignment, the laser beam will not deviate from its position on sensor 96. Any deviation of the point of laser light falling on sensor 96 becomes immediately apparent by watching the monitor, such deviation indicating an out-of-level condition of the table with respect to the toolholder. Once the out-of-level condition is corrected, the table may be moved back and forth toward and away from the toolholder, resulting in the point of light not deviating from its reference position. Likewise, wear of the moving parts of the table may be detected by the point of light deviating from its reference position as the worn portions of the moving components are encountered during table translation.

For determining whether the toolholder and spindle are accurately aligned in perpendicular relation, and after it is ascertained that the table is level with respect to the toolholder, the laser and toolholder are set up as described and the toolholder rotated to various positions. The laser is moved to each position, and the point of light checked to see if it is in the same reference location, which as stated may be crosshairs or a circle indicating the location of the laser beam. If the point of light deviates from the reference position as the spindle is rotated to a different position, then the spindle is not perpendicular to the table.

Where enhanced accuracy is desired, the lens 98 (FIG. 6) may be relatively powerful, such as having a magnification or 20 to 50 or so. This effectively enhances accuracy of the system by magnifying any deviation of the point of light developed by the laser. In other embodiments, a precision conical or multi-faced mirror may be used to provide dynamic indications of conditions of the table and spindle.

Having thus described my invention and the manner of its use, it should be apparent to those skilled in the art that incidental changes may be made thereto that fairly fall within the scope of the following appended claims, wherein I claim:

1. A system for obtaining data with respect to a workpiece comprising:
   a tool holder having an axis of rotation,
   a light sensor in said tool holder and in coaxial alignment with said axis of rotation, said light sensor providing signals indicative of reflected light from said workpiece,
   a receiver of said signals.

2. A system as set forth in claim 1 wherein said light sensor is adjustable with respect to said axis of rotation.

3. A system as set forth in claim 1 further comprising a source of light directed at said workpiece.

4. A system as set forth in claim 3 wherein said source of light includes a laser-producing device developing a laser beam directed at said workpiece.

5. A system as set forth in claim 4 wherein said laser is mounted at a predetermined angle with respect to said workpiece.

6. A system as set forth in claim 5 wherein said light sensor is a video camera providing video signals of said workpiece.

7. A system as set forth in claim 6 further comprising providing an indication of said axis of rotation in an image of said workpiece.

8. A system as set forth in claim 5 wherein said receiver includes a computer for calculating distance information with respect to features on said workpiece and a reference point.

9. A system as set forth in claim 8 further comprising a feedback sensor for providing an indication of angle of said laser beam to said computer.

10. A system as set forth in claim 5 wherein said laser is mounted in said toolholder radially away from said axis of rotation so that said laser beam is directed at an angle toward said workpiece.

11. A system as set forth in claim 5 wherein said laser is movable to direct said laser beam across said workpiece within a field of view of said light sensor.

12. A system as set forth in claim 1 wherein said light sensor is coupled to said receiver by a wireless link.

13. A system as set forth in claim 1 wherein said light sensor is mounted in a housing closely configured to a bore in said toolholder, said bore being coaxial with said axis of rotation.

14. A system for determining height and depth information of features on a workpiece comprising:
    a CNC toolholder,
    an imaging sensor mounted in said CNC toolholder so that a center of said imaging sensor is at least approximately along an axis of rotation of said CNC toolholder,
    a laser mounted radially away from said axis of rotation and directing a laser beam onto said workpiece so that said imaging sensor receives a reflection of where said laser beam impinges said workpiece,
    a computer coupled to said imaging sensor for determining said height and depth information from a knowledge of an angle of said laser beam and where on said imaging sensor said reflection falls.

15. A system as set forth in claim 14 wherein said laser is mounted to said toolholder.

16. A system as set forth in claim 14 wherein said imaging sensor is coupled to said computer by a wireless link.

17. A system as set forth in claim 14 wherein said imaging sensor is adjustably mounted in said toolholder.

18. A system as set forth in claim 14 further comprising providing an indication of said axis of rotation in an image provided by said imaging sensor.

19. A system as set forth in claim 14 wherein said laser is movably mounted so that said laser beam may be moved across said workpiece within a field of view of said imaging sensor, said laser providing an indication of angle of inclination with respect to said axis of rotation.

* * * * *